United States Patent [19]

Shimizu et al.

[11] Patent Number: 5,061,576
[45] Date of Patent: Oct. 29, 1991

[54] THIN FILM MAGNETIC HEAD

[75] Inventors: Osamu Shimizu, Kanagawa; Satoshi Yoshida, Tokyo, both of Japan

[73] Assignee: Fuji Photo Film Co., Ltd., Kanagawa, Japan

[21] Appl. No.: 457,670

[22] Filed: Dec. 27, 1989

[30] Foreign Application Priority Data

Dec. 27, 1988 [JP] Japan ................. 63-327932

[51] Int. Cl.$^5$ ............................................. G11B 5/70
[52] U.S. Cl. .................... 428/694; 428/662; 428/701; 428/702; 428/900
[58] Field of Search ............ 428/694, 701, 702, 900, 428/662; 360/122; 501/103, 134

[56] References Cited

U.S. PATENT DOCUMENTS

| | | | |
|---|---|---|---|
| 4,386,130 | 5/1983 | Hayashi et al. | 428/701 |
| 4,598,053 | 7/1986 | Yamakawa et al. | 501/103 |
| 4,626,480 | 12/1986 | Shigeta et al. | 428/702 |
| 4,931,214 | 6/1990 | Worrell et al. | 501/103 |
| 4,983,465 | 1/1991 | Shimizu et al. | 428/694 |

FOREIGN PATENT DOCUMENTS

| | | |
|---|---|---|
| 023250 | 3/1981 | Japan . |
| 050905 | 3/1985 | Japan . |
| 016218 | 1/1987 | Japan . |
| 208208 | 8/1988 | Japan . |
| 257206 | 10/1988 | Japan . |

Primary Examiner—Merrell C. Cashion, Jr.
Attorney, Agent, or Firm—Sughrue, Mion, Zinn, Macpeak & Seas

[57] ABSTRACT

A thin film magnetic head comprises a substrate, a lower magnetic layer, an insulating layer and an upper magnetic layer formed in that order on said substrate, and a protective layer formed on said upper magnetic layer and having an end surface exposed on the running surface directed to a recording medium. The protective layer consists essentially of 20 to 95 mole % of at least two of $ZrO_2$, $TiO_2$ and $SiO_2$ and 5 to 80 mole % of at least one of $WO_3$ and $MoO_3$, and has controlled Vickers hardness of 400 to 700 kgf/mm$^2$ with reduced residual stress of 0.1–0.5 GPa.

11 Claims, 5 Drawing Sheets

THIN FILM MAGNETIC HEAD

FIELD OF THE INVENTION

This invention relates to a thin film magnetic head and, more particularly, to a thin film magnetic head having an improved protective layer which is formed on the magnetic layer.

BACKGROUND

For producing such thin film magnetic head, upper and lower magnetic layers of Sendust or amorphous materials, coil conductor layers and insulating layers, interposed between the magnetic layers, are formed on a substrate formed of a wear-resistant material, such as ferrite or sapphire through repeated layer forming and etching for patterning to a predetermined shape. And ultimately a protective layer is formed to protect the magnetic layer from abrasion caused by the contact running of the magnetic recording medium. Alumina or $SiO_2$ has been used as the material for the protective layer.

Meanwhile, it is well-known that, if the protective layer is sufficiently harder than the magnetic layer, the magnetic layers undergo wear at an earlier time through the contact running of the recording medium to produce partially advancing abrasive wear, referred to as partial abrasion, in the magnetic layers, and hence the spacing loss.

On the other hand, if the protective layer is too soft, wear is promoted on the whole so that the service life of the head is shortened. It is therefore preferred that the protective layer has a hardness about equal to or slightly lower than that of the magnetic layers.

For example, with the Vickers hardness Hv of the magnetic layers of 600 to 650 kgf/mm², the vickers hardness Hv of the protective layer is preferably set so as to be in the range of from 400 to 600 kgf/mm².

It is also necessary for the thickness of the protective layer to be about 20 to 40 μm or more in view of sliding properties and the resistance to partial abrasion of the recording medium. However, with this order of the layer thickness, the protective layer usually undergoes peeling or cracking under the accumulated internal stress. It is therefore necessary to reduce the internal stress to as low a value as possible. One of efficient measures to cope with this problem is to match the thermal expansion coefficients of the respective component materials of the magnetic head with one another. However, it has been difficult in general to adjust the thermal expansion coefficient of the magnetic metal material to that of the protective layer.

The JP Patent Kokai Publication 62-16218 discloses a mixture of MgO and $SiO_2$ as a material for the protective layer which is effective to prevent the occurrence of partial abrasion. It is also disclosed therein that, by setting the $MgO/SiO_2$ compositional ratio so as to be 10 to 70% in terms of $SiO_2$ amount, a moderate hardness Hv of 450 to 850 and a desirable thermal expansion coefficient may be achieved.

However, it has not been possible with this protective layer to satisfy the requirements for corrosion resistance or workability in addition to the requirements concerning the basic properties of the protective layer.

SUMMARY OF THE DISCLOSURE

It is a principal object of the present invention to provide a thin film magnetic head whereby the above mentioned problems in the prior art may be eliminated extensively. Other objects will become apparent in the entire disclosure.

For accomplishing the above object, the present invention provides a thin film magnetic head comprising a substrate, a lower magnetic layer, an insulating layer and an upper magnetic layer formed in that order on said substrate, and a protective layer formed on said upper magnetic layer and having an end surface exposed on the running surface directed to a recording medium, wherein the improvement resides in that said protective layer consists essentially of 20 to 95 mole % of at least two of $ZrO_2$, $TiO_2$ and $SiO_2$ and 5 to 80 mole % of at least one of $WO_3$ and $MoO_3$.

Preferably, not more than 20 mole % of $ZrO_2$ is replaced by at least one of $Y_2O_3$, MgO, CaO and oxides of rare earth metals. These elements act as stabilizers for $ZrO_2$.

The protective layer of the inventive thin film magnetic head has a Vickers hardness Hv in the range from about 400 to about 750 kgf/mm², so that it is not too soft, while it exhibits satisfactory matching in abrasion properties with Co base amorphous material or Sendust usually employed as the magnetic layer and having a Vickers hardness Hv approximately equal to 650 kgf/mm².

When the protective layer is formed directly on the magnetic layer, such as by sputtering, substantially no residual stress is produced, so that peeling or cracking of the protective layer may be prevented from occurring.

The protective layer is not deteriorated under high temperature and high humidity conditions, and it exhibits a satisfactory corrosion resistance.

When the protective layer is mechanically processed after it has been formed into a magnetic layer, no peeling or cracking is produced in the protective layer. It can also be subjected to reactive etching with a fleon type gas.

By referring to the drawings, a preferred illustrative embodiment of the present invention will be explained in detail.

DESCRIPTION OF PREFERRED EMBODIMENTS

Figure 1:
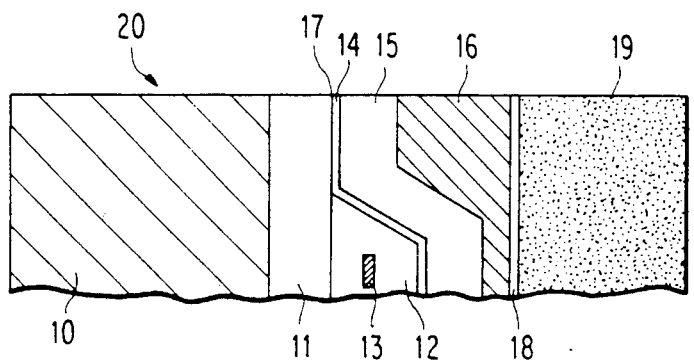
FIG. 1 is a cross-sectional view showing a thin-film magnetic head according to the present invention.

The protective film of the thin film magnetic head of the present invention is mainly composed of 20 to 95 mole % of two or more of $ZrO_2$, $TiO_2$ and $SiO_2$ and 5 to 80 mole % of one or more of $WO_3$ and $MoO_3$.

If the amount of one or more of $WO_3$ and $MoO_3$ is less than 5 mole %, the protective layer becomes harder than the customarily employed magnetic layer, with its Vickers hardness exceeding 750 kgf/mm² thus the magnetic layer undergoing partial abrasion. Conversely, if the amount of one or more of $WO_3$ or $MoO_3$ exceeds 80 mole %, the protective layer becomes too low, with its Vickers hardness being less than 400 kgf/mm², to accelerate the abrasive wear. Preferred is an amount of one or more of $WO_3$ and $MoO_3$ in the range from 40 and 70 mole %.

The protective layer, which can be formed by vapor deposition technique, such as sputtering, CVD or electron beam evaporation, contains not less than 5 mole % of one or both of $WO_3$ and $MoO_3$, so that, even with the use of the sputtering method, the protective layer exhibiting lesser strain and lesser residual stress less than about 0.5 GPa may be produced. Thus the protective layer can be formed stably on the magnetic layer by the above mentioned methods.

When the protective layer is formed by sputtering, one or more of $Y_2O_3$, MgO, CaO and oxides of rare earth metals may be added to a $ZrO_2$ target as the stabilizer, while one or more of sintering aids may be added to a $TiO_2$ target, for ease in target manufacture or availability. The oxides of rare earth metals include those of Yb, Sc, Nd and Sm. Thus the aforementioned stabilizers or sintering aids may be contained in the protective layer. The content of the stabilizer in the protective layer is desirably so selected that an amount of the stabilizer of not more than 20 mole %, preferably 10 mole %, of $ZrO_2$ is contained in the protective layer, that is, an amount sufficient for stabilization or partial stabilization of $ZrO_2$, is substituted for part of $ZrO_2$. The content of the sintering aids in the protective layer may be such that an amount of the sintering aids of not more than 10 mole % of the main constituents of the protective layer on the whole is substituted for part of $TiO_2$.

Other components may be contained in the protective layer if the properties required of the protective layer are thereby satisfied. For example, the sintering aids for the $ZrO_2$ target is preferably used in a combined amount with the stabilizer in an amount of not more than 20 mole % based on the amount of $ZrO_2$. For example, $SiO_2$, $Al_2O_3$ or clay may be contained in the protective layer.

EXAMPLES

The present invention will be explained further with reference to examples thereof and the accompanying drawings.

By referring to FIG. 1, which is a cross-sectional view showing the structure of an embodiment of the thin film magnetic head of the present invention, the manufacture process of the thin film magnetic head is hereinafter explained.

EXAMPLE 1

In FIG. 1, a Co-Nb-Zr ferromagnetic alloy is deposited on a ferrite substrate 10 to a thickness of 10 μm to form a lower magnetic layer 11. Then, a non-magnetic insulating layer 12 formed of, for example, $SiO_2$ or the like, and a coil conductor layer 13 formed of Cu or Al, are formed at preselected positions on the lower magnetic layer 11. The non-magnetic insulating layer 12, which includes the coil conductor layer 13, is then etched by ion milling to a substantially trapezoidal cross-section. A gap layer 14 is then formed and, at a predetermined position (lower position below FIG. 1, not shown) at which upper magnetic layer 15 is to be connected directly with an upper magnetic layer 11 which will be subsequently formed, the gap layer 14 is removed. Then, a Co-Nb-Zr metal alloy magnetic material is deposited, such as by sputtering, to a thickness of 15 μm, to produce the upper magnetic layer 15 which is united to the lower magnetic layer 11 at the predetermined position (lower position below FIG. 1).

A protective layer 16, characteristic of the present invention, is then formed on the upper magnetic layer 15.

The protective layer 16 was formed by diode RF magnetron sputtering device. As a target, a $ZrO_2$ target containing 3 mole % of $Y_2O_3$ and on which small pieces (each 5×5 mm) of $TiO_2$ and $WO_3$ were attached, was used. With a pressure of 0.4 Pa of an argon gas, containing 4% $O_2$, a cathode power of 350 W and a target-substrate distance of 60 mm, a 40 μm thick protective layer was produced, while the substrate was cooled with water. This protective layer was mainly composed of 55 mole % of $ZrO_2$, 27 mole % of $TiO_2$ and 18 mole % of $WO_3$.

After the protective layer was formed in the above described manner, the protective layer 16 was flattened, and a protective plate 19 was affixed to the layer 16 by means of an epoxy type adhesive layer 18. A running surface 20 directed to the recording medium was then smoothed to produce a thin film magnetic head according to an embodiment of the present invention.

EXAMPLES 2 to 12

Thin film magnetic heads were produced in the same way as in Example 1, except that, for forming the protective layer of Example 1, the aforementioned $ZrO_2$ target, on which one or more of a small piece (5×5 mm) of $WO_3$ and $MoO_3$, and a small piece (5×5 mm) of $TiO_2$ or $SiO_2$ were attached, was used as the target. The main components and their contents of the protective layers are shown in Table 1.

EXAMPLES 13 to 18

Thin film magnetic heads were produced in the same way as in Example 1, except that, for forming the protective layer of Example 1, the $TiO_2$ target, on which a small piece (5×5 mm) of $SiO_2$ and small pieces (each 5×5 mm) of one or both of $WO_3$ and $MoO_3$ were attached, was used as the target. Meanwhile, the $TiO_2$ target is not formed of stoichiometric $TiO_2$ but possibly has the composition of $TiO_x$ with part of oxygen of $TiO_2$ being removed. The main components and their contents of the protective layers are shown in Table 1.

EXAMPLES 19 to 24

Thin film magnetic heads were produced in the some way as in Example 1, except that, for forming the protective layer of Example 1, the $SiO_2$ target, on which small piece (each 5×5 mm) of $SiO_2$ and $TiO_2$ and at least one of small pieces (5×5 mm) of $WO_3$ and $MoO_3$ were attached, was used as the target. The main components and their contents are also shown in Table 1.

Comparative Examples 1 to 3

Thin film magnetic heads were produced in the same way as in Example 1, except that only the target of $ZrO_2$ (Comparative Example 1), the target of $TiO_2$ (Comparative Example 2) and the target of $SiO_2$ (Comparative Example 3) were used as the targets. The main components of the protective layers and their contents are shown in Table 2.

TABLE 1

| Ex. No. | Main Components of Protective Layers and Amount (mole %) | | | | | Hv (Hardness) (kgf/mm²) | σ (Stress) (GPa) |
|---|---|---|---|---|---|---|---|
| | $ZrO_2$ | $TiO_2$ | $SiO_2$ | $WO_3$ | $MoO_3$ | | |
| 1  | 55 | 27 | —  | 18 | —  | 750 | 0.45 |
| 2  | 27 | 10 | —  | 63 | —  | 470 | 0.12 |
| 3  | 53 | 31 | —  | —  | 16 | 750 | 0.47 |
| 4  | 16 | 11 | —  | —  | 73 | 400 | 0.11 |
| 5  | 57 | 29 | —  | 6  | 8  | 700 | 0.40 |
| 6  | 18 | 14 | —  | 31 | 37 | 400 | 0.09 |
| 7  | 31 | —  | 62 | 7  | —  | 750 | 0.48 |
| 8  | 29 | —  | 13 | 58 | —  | 500 | 0.10 |
| 9  | 32 | —  | 59 | —  | 9  | 700 | 0.41 |
| 10 | 30 | —  | 12 | —  | 58 | 400 | 0.13 |
| 11 | 42 | —  | 46 | 8  | 4  | 700 | 0.32 |
| 12 | 23 | —  | 21 | 31 | 25 | 450 | 0.11 |
| 13 | —  | 32 | 63 | 5  | —  | 750 | 0.45 |
| 14 | —  | 27 | 16 | 57 | —  | 500 | 0.13 |
| 15 | —  | 31 | 54 | —  | 15 | 650 | 0.31 |
| 16 | —  | 12 | 26 | —  | 62 | 400 | 0.15 |
| 17 | —  | 38 | 49 | 7  | 6  | 700 | 0.30 |
| 18 | —  | 23 | 27 | 31 | 19 | 500 | 0.18 |
| 19 | 27 | 29 | 25 | 19 | —  | 650 | 0.25 |
| 20 | 15 | 13 | 15 | 57 | —  | 450 | 0.10 |
| 21 | 30 | 31 | 34 | —  | 5  | 750 | 0.39 |
| 22 | 11 | 15 | 14 | —  | 60 | 450 | 0.09 |
| 23 | 28 | 25 | 26 | 12 | 9  | 600 | 0.21 |
| 24 | 12 | 10 | 13 | 31 | 34 | 400 | 0.12 |

TABLE 2

| Comp. Ex. No. | Main Components of Protective Layer and Amounts (mole %) | | | | | Hv (Hardness) (kgf/mm²) | σ (Stress) (GPa) |
|---|---|---|---|---|---|---|---|
| | $ZrO_2$ | $TiO_2$ | $SiO_2$ | $WO_3$ | $MoO_3$ | | |
| C1 | 100 | —   | —   | — | — | 1300 | 1.8  |
| C2 | —   | 100 | —   | — | — | 1400 | 1.9  |
| C3 | —   | —   | 100 | — | — | 850  | 0.55 |

C: Comparative Examples

REFERENCE EXAMPLE 25

A thin film magnetic head provided with a protective layer having a composition of $[(ZrO_2)_{0.97} (Y_2O_3)_{0.03}]_{1-x}[WO_3]_x$ was produced, in the same way as in Example 1, except that, for forming the protective layer of example 1, the $ZrO_2$ target containing 3 mole % of $Y_2O_3$ as the stabilizer and on which a small piece (5×5 mm) of $WO_3$ was placed, was used as the target.

REFERENCE EXAMPLE 26

A thin film magnetic head having a protective layer having a composition of $(TiO_2)_{1-x}(WO_3)_x$ was produced, in the same way as in Example 1, except that, for forming the protective layer of Example 1, the aforementioned $TiO_2$ target on which a small piece (5×5 mm) of $WO_3$ was placed, was used as the target.

REFERENCE EXAMPLE 27

A thin film magnetic head having a protective layer having a composition of $(SiO_2)_{1-x}(WO_3)_x$ was produced, in the same way as in Example 1, except that the $SiO_2$ target on which a small piece (5×5 mm) of $WO_3$ was attached, was used as the target.

EVALUATION (i) The hardness of each of the protective layers of the Examples 1 to 24 and the Comparative Examples 1 to 3 was measured by the micro Vickers hardness measurement method, using a load of 25 g. The results (Hv) are shown in Table 1 and 2.

Figure 2:
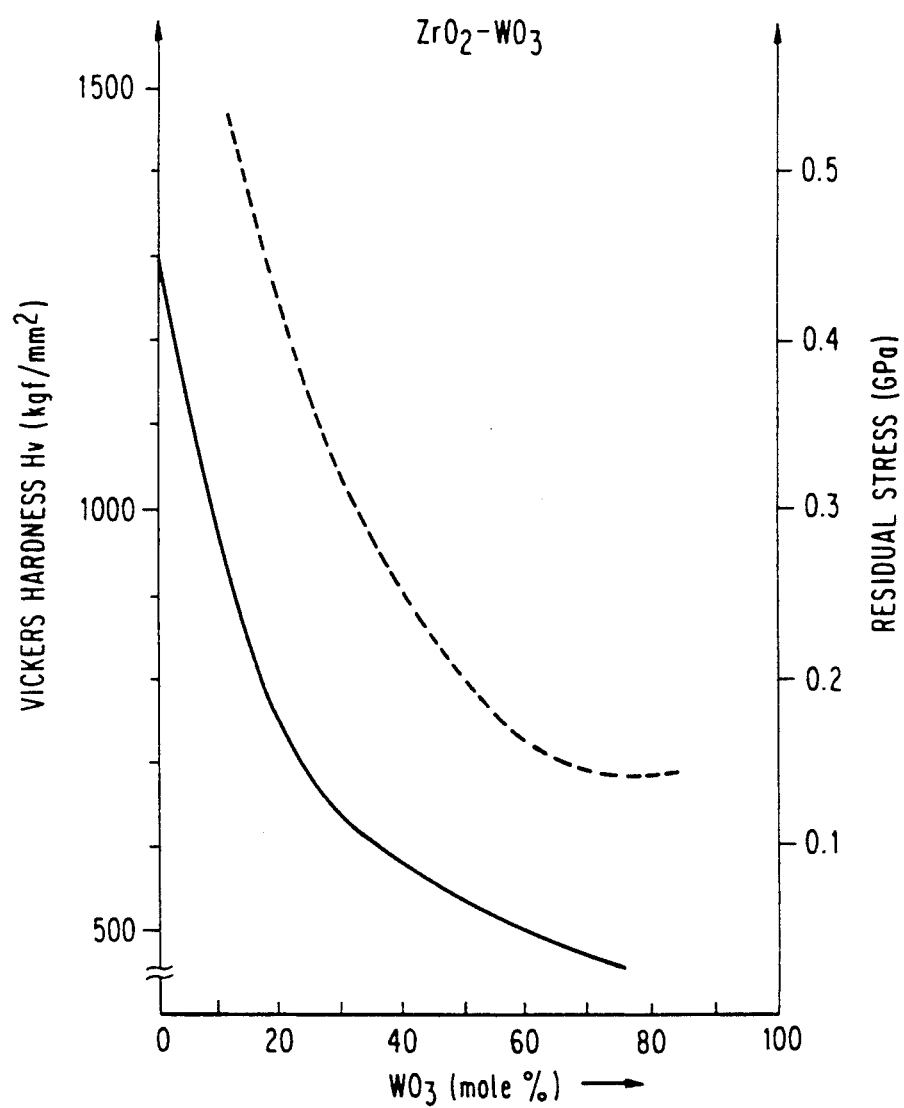
FIGS. 2, 5 and 8 are charts showing the amount of $WO_3$ in mole percent with respect to the Vickers hardness Hv and the internal stress.
Figure 3:
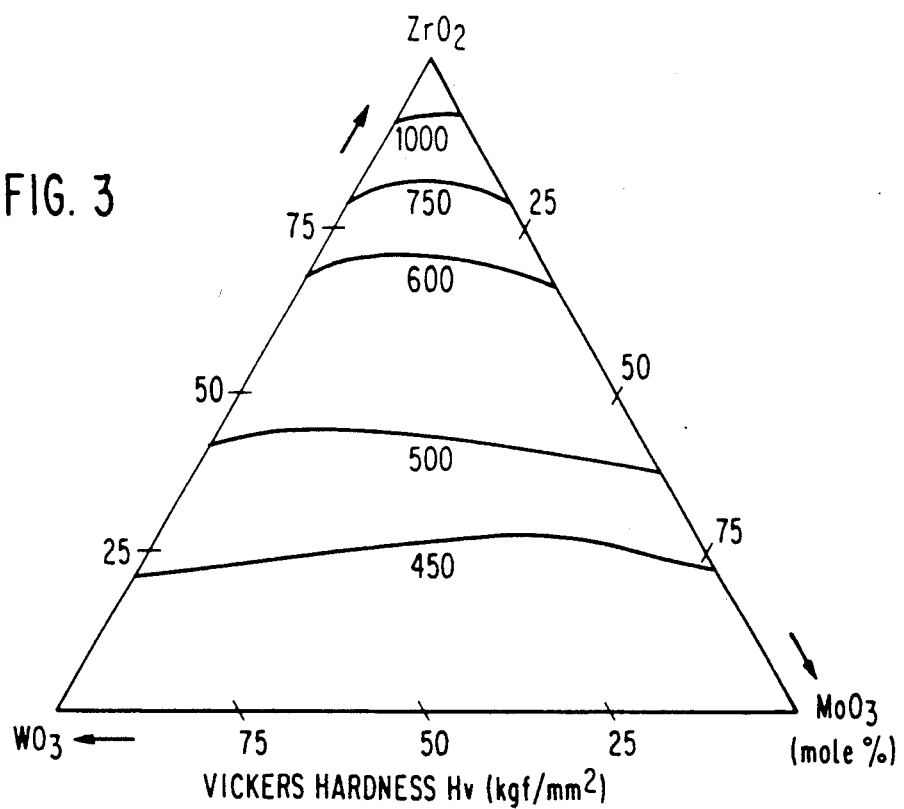
FIGS. 3 and 4 are charts showing the Vickers hardness and the residual stress of a protective layer mainly composed of $ZrO_2$-$WO_3$-$MoO_3$, respectively.

The results of similar measurement of the hardness of the protective layer having the composition of $[(ZrO_2)_{0.97} (Y_2O_3)_{0.03}]_{1-x}[WO_3]_x$ according to Reference Example 25, are shown by a solid line in FIG. 2. The hardness of the protective layer consisting mainly of $ZrO_2$-$WO_3$-$MoO_3$ was similarly measured. The results are shown in FIG. 3.

Figure 5:
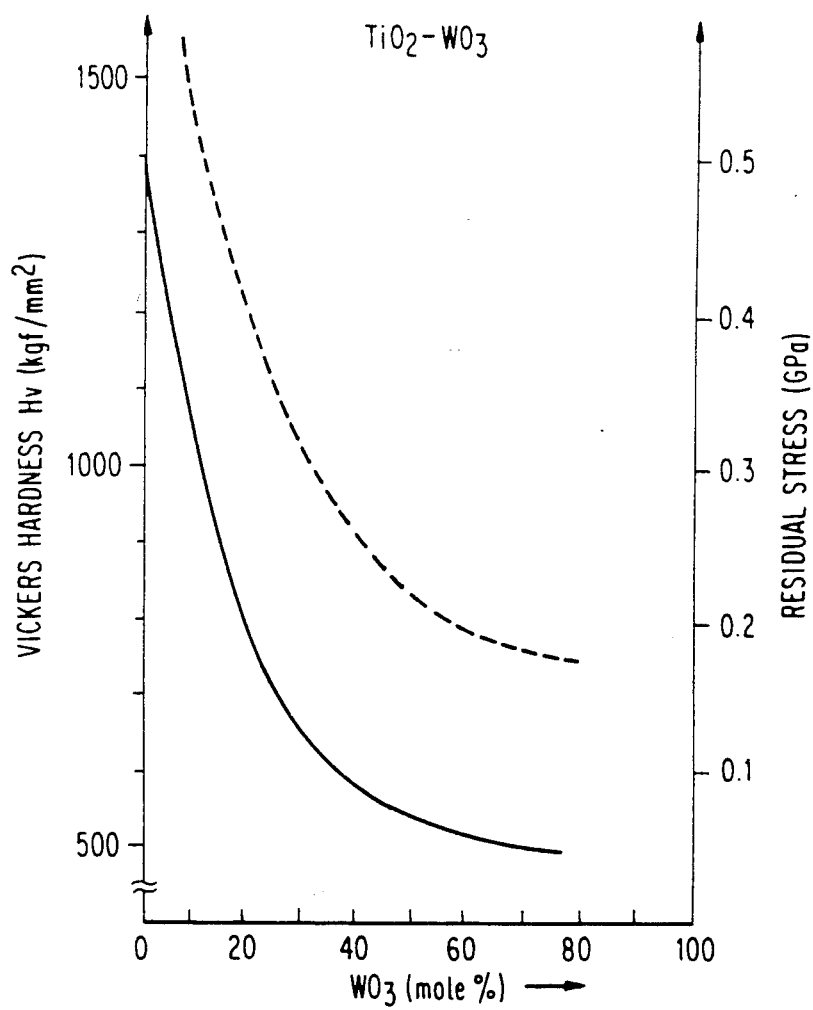
Figure 6:
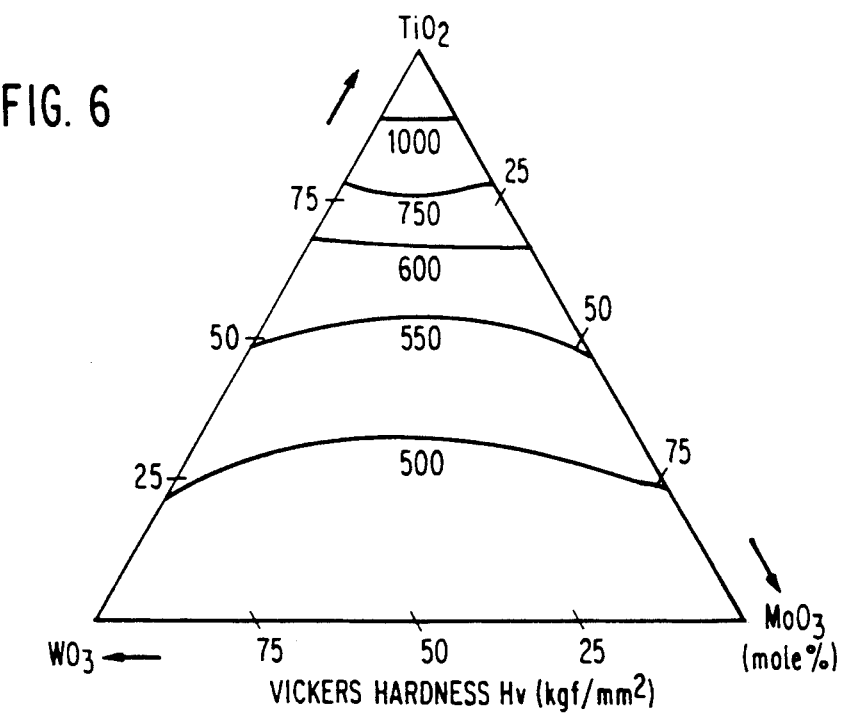
FIGS. 6 and 7 are charts showing the Vickers hardness and the residual stress of a protective layer mainly composed of $TiO_2$-$WO_3$-$MoO_3$, respectively.

The results of similar measurement of the hardness of the protective layer having the composition of $(TiO_2)_{1-x}(WO_3)_x$ according to Reference Example 26 are shown by a solid line in FIG. 5. The hardness of the protective layer consisting mainly of $TiO_2$-$WO_3$-$MoO_3$ was similarly measured. The results are shown in FIG. 6.

Figure 8:
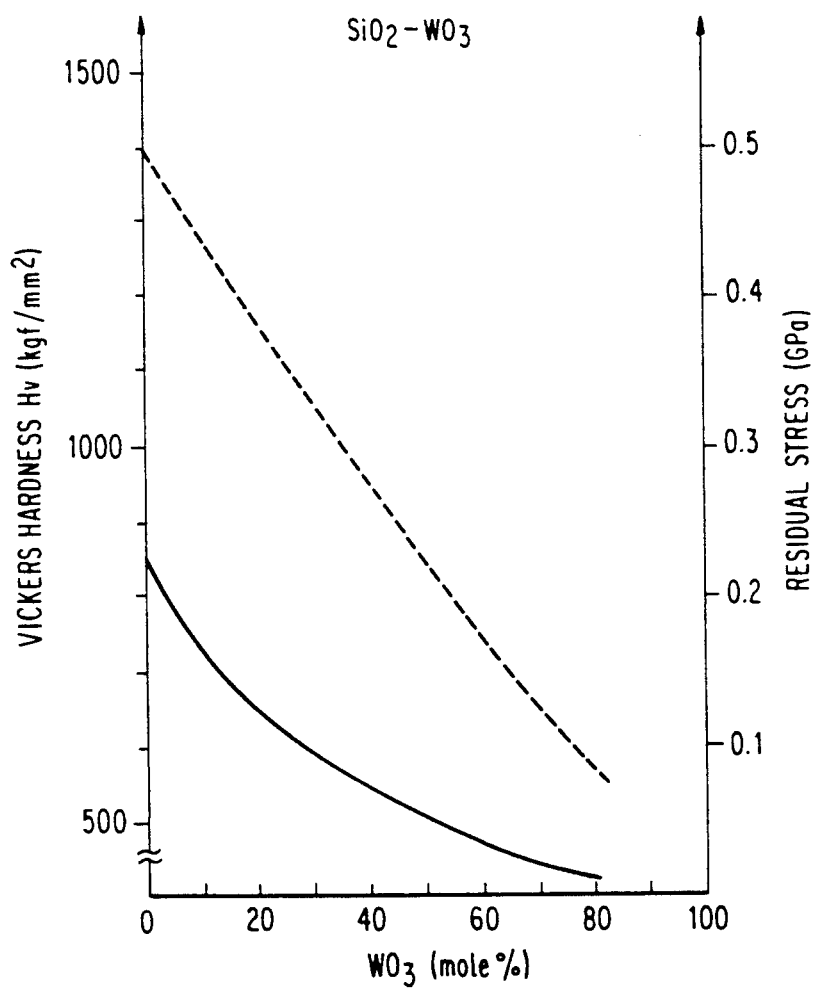
Figure 9:
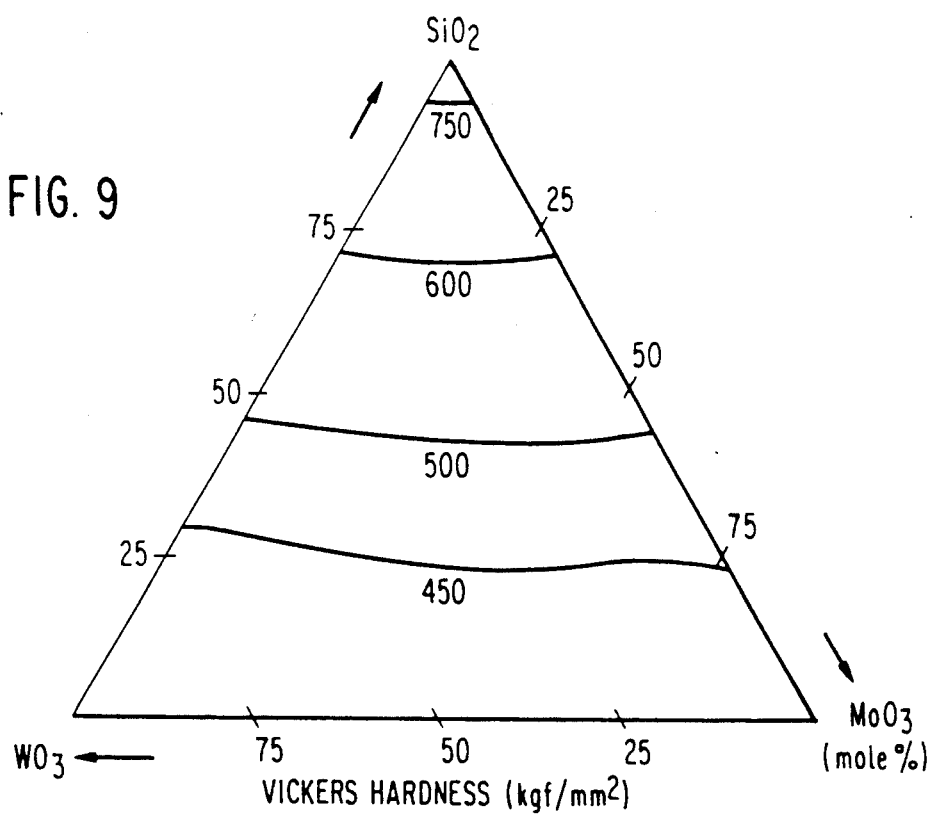
FIGS. 9 and 10 are charts showing the Vickers hardness and the residual stress of a protective layer mainly composed of $SiO_2$-$WO_3$-$MoO_3$.

The hardness of the protective layer having the composition of $(SiO_2)_{1-x}(WO_3)_x$ according to Reference Example 27 was similarly measured. The results are shown by a solid line in FIG. 8. The hardness of the protective layer mainly consisting of $SiO_2$-$WO_3$-$MoO_3$ was similarly measured. The results are shown in FIG. 9.

It may be seen from above that the protective layer within the composition range as defined in the claims exhibits hardness superior to that of the conventional magnetic layer.

(ii) Protective layers, each 5 μm thick and having the same compositions as the Examples 1 to 24 and the Comparative Examples 1 to 3, were formed each on a 0.3 mm thick sapphire substrate, under the same film forming conditions as those of the aforementioned Examples and Comparative Examples. Warping of each sapphire substrate was measured and the measured value was converted into the residual stress (σ) of each protective layer. The results are shown in Tables 1 and 2.

Figure 4:
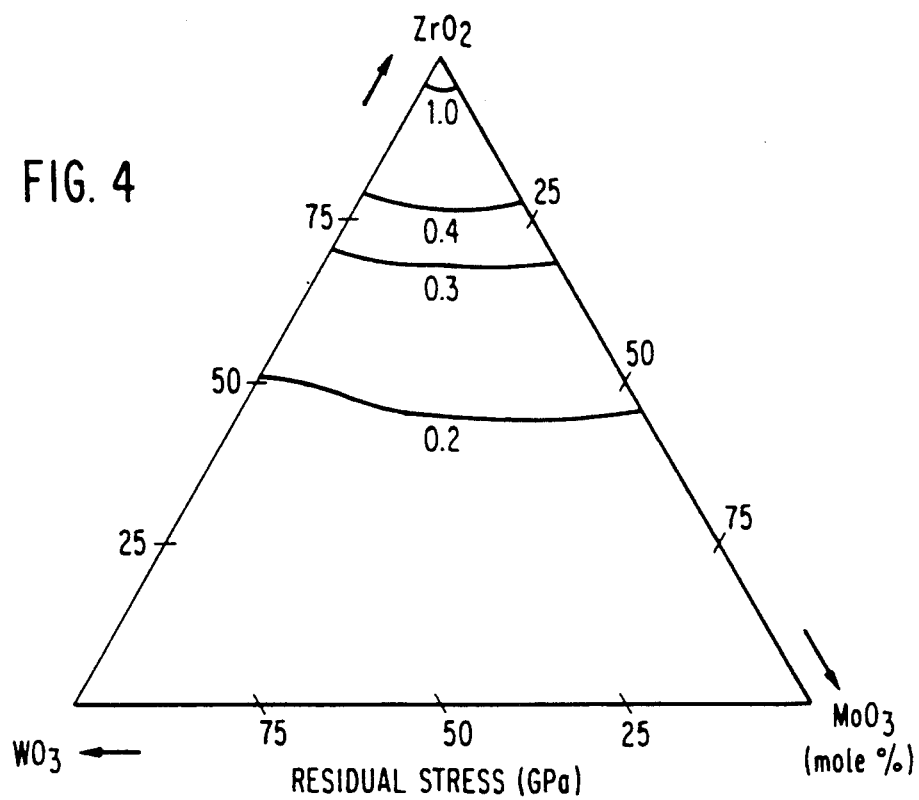
Figure 7:
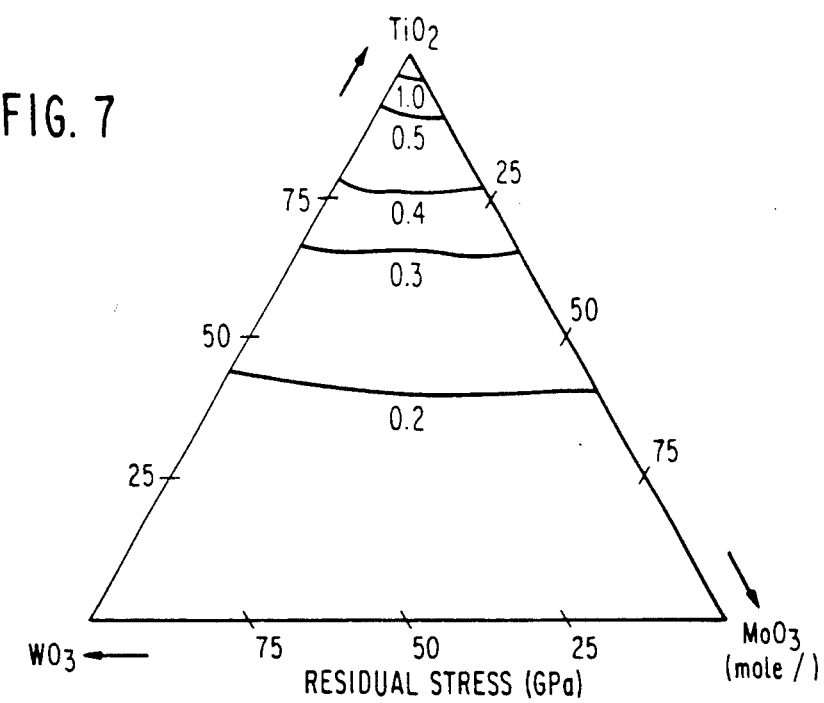
Figure 10:
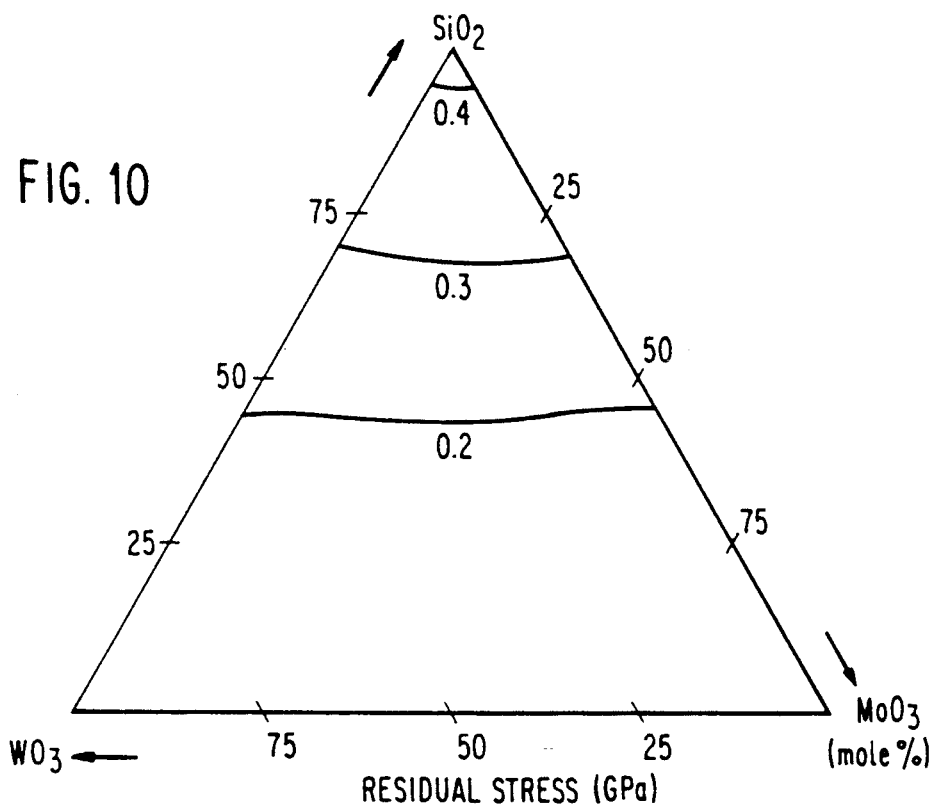

Similarly, protective layers, each 5 μm thick and having the same compositions as the Reference Examples 25 to 27, were formed each on a 0.3 mm thick sapphire substrate, under the same film forming conditions of the Reference Examples. Warping of each sapphire substrate was measured and the measured value was converted into the residual stress of each protective layer. The results are shown by broken lines in FIGS. 2, 5 and 8. Similarly, protective layers, each consisting mainly of $ZrO_2$-$WO_3$-$MoO_3$, $TiO_2$-$WO_3$-$MoO_3$ and $SiO_2$-$WO_3$-$MoO_3$, were formed each on a 0.3 mm thick sapphire substrate, and the residual stress was found in the similar manner. The results are shown in FIGS. 4, 7 and 10.

It may be seen from above that the residual stress of the substrate, on which the protective layer having the composition range defined in the claims is formed, is extremely small.

(iii) Several thin film magnetic heads according to the Examples of the present invention, which were prepared by using the process similar to the processes of the above Examples, were attached to a floppy disk apparatus and kept in running contact with a recording medium (Fujix VF-HR) for 1,000 hours to observe the state of partial abrasion. This partial abrasion was checked by observing the interference fringes by an optical flat and checking the step-like difference between the magnetic layer and the protective layer. It was found that such step-like difference was not observed and thus the state of partial abrasion was not brought about with the protective layer within the composition range of the present invention.

It should be noted that modification in the art may be done without departing from the gist and scope of the present invention as herein disclosed and hereinbelow claimed.

What is claimed is:

1. A thin film magnetic head having a running surface directed to a recording medium, and comprising a substrate, a lower magnetic layer, an insulating layer, and an upper magnetic layer, formed in that order on said substrate, and a protective layer formed on said upper magnetic layer and exposed on the running surface, wherein the improvement resides in that said protective layer consists essentially of 20 to 95 mole % of at least two of $ZrO_2$, $TiO_2$ and $SiO_2$, and 5 to 80 mole % of at least one of $WO_3$ and $MoO_3$.

2. A thin film magnetic head as defined in claim 1 wherein not more than 20 mole % of $ZrO_2$ is replaced by at least one selected from the group consisting of $Y_2O_3$, MgO, CaO and oxides of rare earth metals.

3. A thin film magnetic head as defined in claim 1 wherein a sintering aid is present in the protective layer in an amount of not more than 10 mole % of the protective layer.

4. A thin film magnetic head as defined in claim 1 wherein the protective layer has a Vickers hardness of 400 to 700 $kgf/mm^2$.

5. A thin film magnetic head as defined in claim 1 wherein said at least one of $WO_3$ and $MoO_3$ is present in an amount of 40 to 70 mole %.

6. A thin film magnetic head as defined in claim 1 wherein the protective layer has a residual stress of less than 0.5 GPa.

7. A thin film magnetic head as defined in claim 5 wherein the protective layer has a residual stress of less than 0.3 GPa.

8. A thin film magnetic head as defined in claim 5 wherein the protective layer has a residual stress of not more than 0.2 GPa.

9. A thin film magnetic head as defined in claim 1 or 5 in which said at least two of $ZrO_2$, $TiO_2$ and $SiO_2$ are $ZrO_2$ and $TiO_2$.

10. A thin film magnetic head as defined in claim 1 or 5 in which said at least two of $ZrO_2$, $TiO_2$ and $SiO_2$ are $ZrO_2$ and $SiO_2$.

11. A thin film magnetic head as defined in claim 1 or 5 in which said at least two of $ZrO_2$, $TiO_2$ and $SiO_2$ are $ZrO_2$, $TiO_2$ and $SiO_2$.

* * * * *